(12) United States Patent
Okwii et al.

(10) Patent No.: US 10,547,524 B2
(45) Date of Patent: Jan. 28, 2020

(54) DIAGNOSTIC TRANSPARENCY FOR ON-PREMISE SAAS PLATFORMS

(71) Applicant: Cisco Technology, Inc., San Jose, CA (US)

(72) Inventors: Timothy Okwii, London (GB); Amit Kumar Saha, Bangalore (IN); Debojyoti Dutta, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 253 days.

(21) Appl. No.: 15/499,269

(22) Filed: Apr. 27, 2017

(65) Prior Publication Data

US 2018/0316581 A1    Nov. 1, 2018

(51) Int. Cl.
| | | |
|---|---|---|
| H04L 12/26 | (2006.01) | |
| H04L 12/24 | (2006.01) | |
| H04L 29/06 | (2006.01) | |
| H04W 4/70 | (2018.01) | |

(52) U.S. Cl.
CPC ............ H04L 43/065 (2013.01); H04L 43/12 (2013.01); H04L 67/42 (2013.01); *H04L 41/22* (2013.01); *H04W 4/70* (2018.02)

(58) Field of Classification Search
CPC ........ H04L 43/065; H04L 67/42; H04L 41/22
See application file for complete search history.

(56) References Cited

U.S. PATENT DOCUMENTS

| | | | |
|---|---|---|---|
| 8,434,129 B2 | 4/2013 | Kannappan et al. | |
| 9,100,320 B2 | 8/2015 | Hsy et al. | |
| 9,135,145 B2 | 9/2015 | Voccio et al. | |
| 9,197,606 B2 | 11/2015 | Deschênes et al. | |
| 10,015,069 B1* | 7/2018 | Blank | H04L 41/5038 |
| 2006/0159028 A1* | 7/2006 | Curran-Gray | H04L 43/026 370/252 |
| 2006/0264178 A1* | 11/2006 | Noble | H04B 17/0085 455/67.11 |
| 2008/0075103 A1* | 3/2008 | Noble | H04L 41/069 370/429 |

(Continued)

OTHER PUBLICATIONS

Everything you need to know about network probes. www.helpsystems.com. Aug. 2016 (Year: 2016).*

(Continued)

*Primary Examiner* — Uzma Alam
(74) *Attorney, Agent, or Firm* — Behmke Innovation Group LLC; James Behmke; Stephen D. LeBarron (57) ABSTRACT

In one embodiment, a server determines a trigger to diagnose a software as a service (SaaS) pipeline for a SaaS client, and sends a notification to a plurality of SaaS nodes in the pipeline that the client is in a diagnostic mode, the notification causing the plurality of SaaS nodes to establish taps to collect diagnostic information for the client. The server may then send client-specific diagnostic messages into the SaaS pipeline for the client, the client-specific diagnostic messages causing the taps on the plurality of SaaS nodes to collect client-specific diagnostic information and send the client-specific diagnostic information to the server. The server then receives the client-specific diagnostic information from the plurality of SaaS nodes, and creates a client-specific diagnostic report based on the client-specific diagnostic information.

20 Claims, 8 Drawing Sheets

(56) References Cited

U.S. PATENT DOCUMENTS

| | | | |
|---|---|---|---|
| 2014/0047106 A1* | 2/2014 | Leung | H04L 43/08 709/224 |
| 2014/0229605 A1 | 8/2014 | Besser | |
| 2016/0028831 A1* | 1/2016 | Rantapuska | H04L 67/16 709/228 |
| 2016/0127218 A1* | 5/2016 | Maloo | H04L 43/12 370/390 |
| 2016/0315815 A1* | 10/2016 | Sharma | H04L 45/026 |
| 2017/0223043 A1* | 8/2017 | Munoz | H04L 63/1483 |
| 2017/0230263 A1* | 8/2017 | Shelton | H04L 43/0817 |
| 2017/0230270 A1* | 8/2017 | Padinhakara | H04L 43/04 |

OTHER PUBLICATIONS

What is Network Tap. Techopedia. Year: Aug. 2019 (Year: 2019).*
"Google Stackdriver", https://cloud.google.com/stackdriver/, Stackdriver—Hybrid Monitoring—Google Cloud Platform, 4 pages, Accessed Dec. 12, 2016, Google.
"How to collect the DART bundle for Anyconnect", https://supportforums.cisco.com/document/12747756/how-collect-dart-bundle-anyconnect, VPN—Cisco Support Community, Accessed Dec. 12, 2016 , Cisco.

* cited by examiner

DIAGNOSTIC TRANSPARENCY FOR ON-PREMISE SAAS PLATFORMS

TECHNICAL FIELD

The present disclosure relates generally to computer networks, and, more particularly, to diagnostic transparency for on-premise software as a service (SaaS) platforms.

BACKGROUND

It is not uncommon to have enterprise software as a service (SaaS) products that handle and store significant amounts of data. Often these platforms need to be on the customer's premises for privacy and compliance reasons (e.g., an organization in the European Union might not want data in a SaaS in the United States, but they might consume the SaaS product if they can host it). However, in such cases one needs to provide the "users" or a class of elite users certain diagnostic capabilities and visibility of the underlying platform.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a server determines a trigger to diagnose a software as a service (SaaS) pipeline for a SaaS client, and sends a notification to a plurality of SaaS nodes in the pipeline that the client is in a diagnostic mode, the notification causing the plurality of SaaS nodes to establish taps to collect diagnostic information for the client. The server may then send client-specific diagnostic messages into the SaaS pipeline for the client, the client-specific diagnostic messages causing the taps on the plurality of SaaS nodes to collect client-specific diagnostic information and send the client-specific diagnostic information to the server. The server then receives the client-specific diagnostic information from the plurality of SaaS nodes, and creates a client-specific diagnostic report based on the client-specific diagnostic information.

According to one or more additional embodiments of the disclosure, a SaaS node along a SaaS pipeline for a SaaS client receives a notification that the client is in a diagnostic mode, and in response, establishes a tap to collect diagnostic information for the client. Upon receiving client-specific diagnostic messages, the SaaS node collects, by the tap at the SaaS node, client-specific diagnostic information, and sends the client-specific diagnostic information to a server.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

Figure 1A:
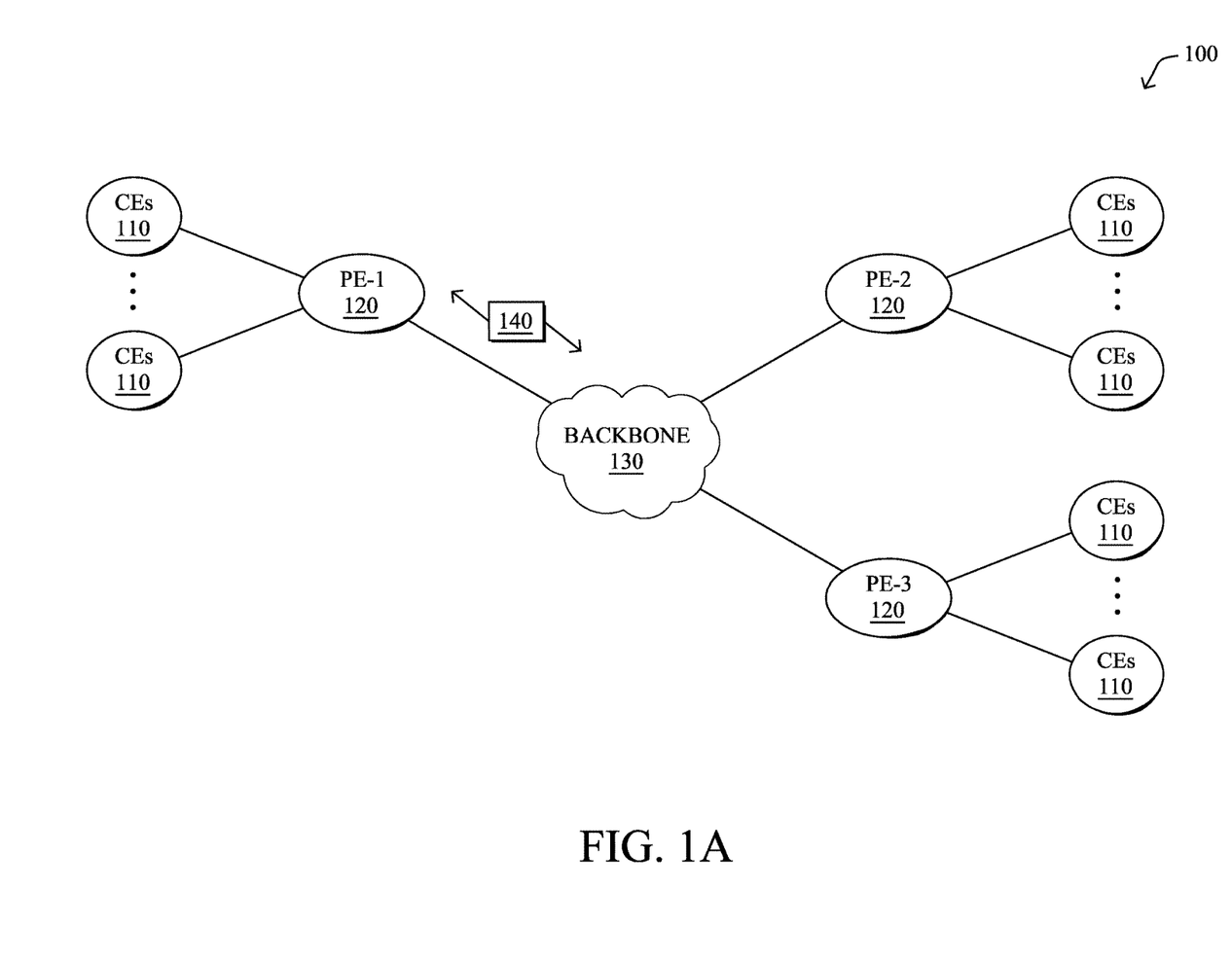
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
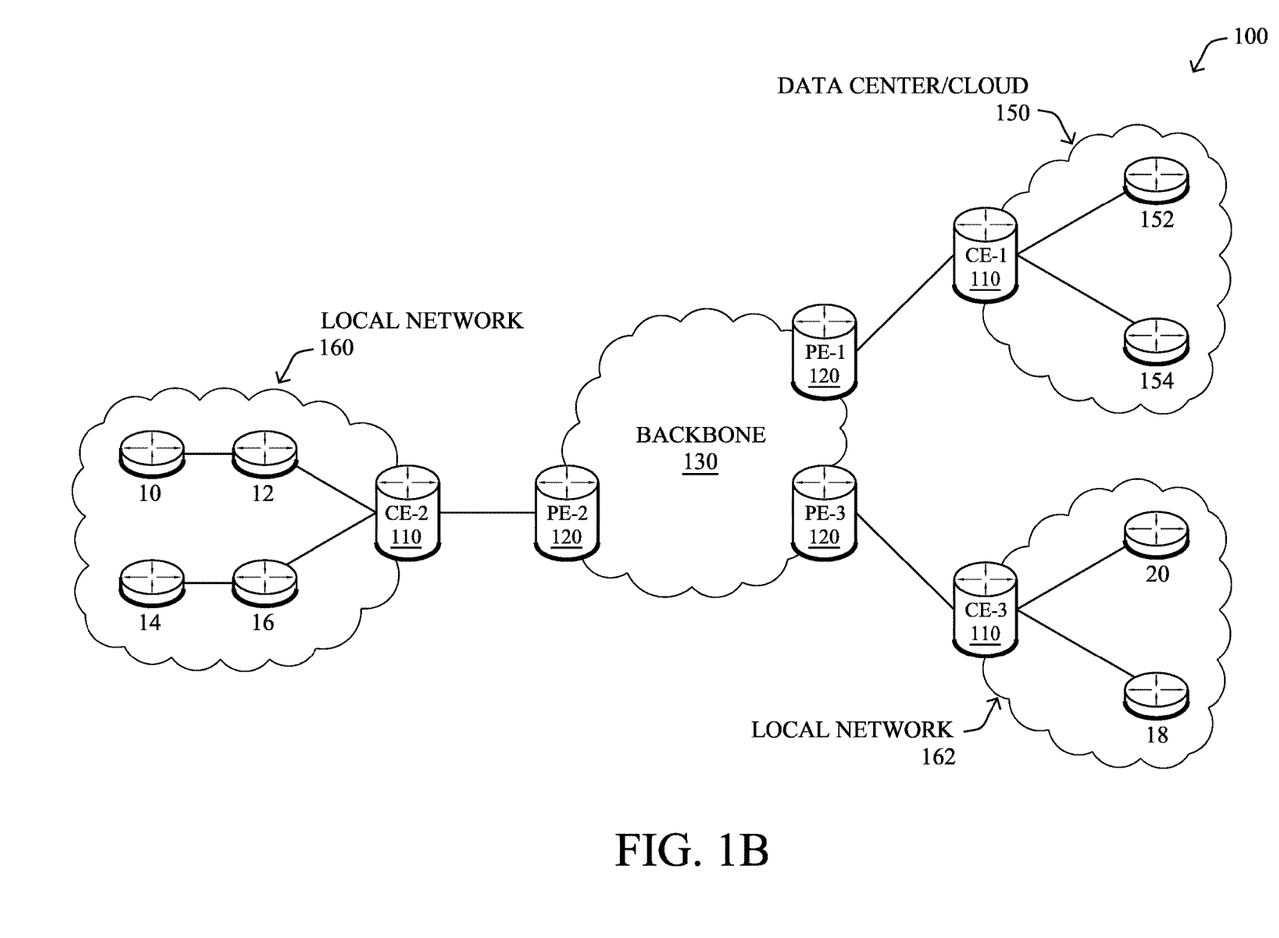

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
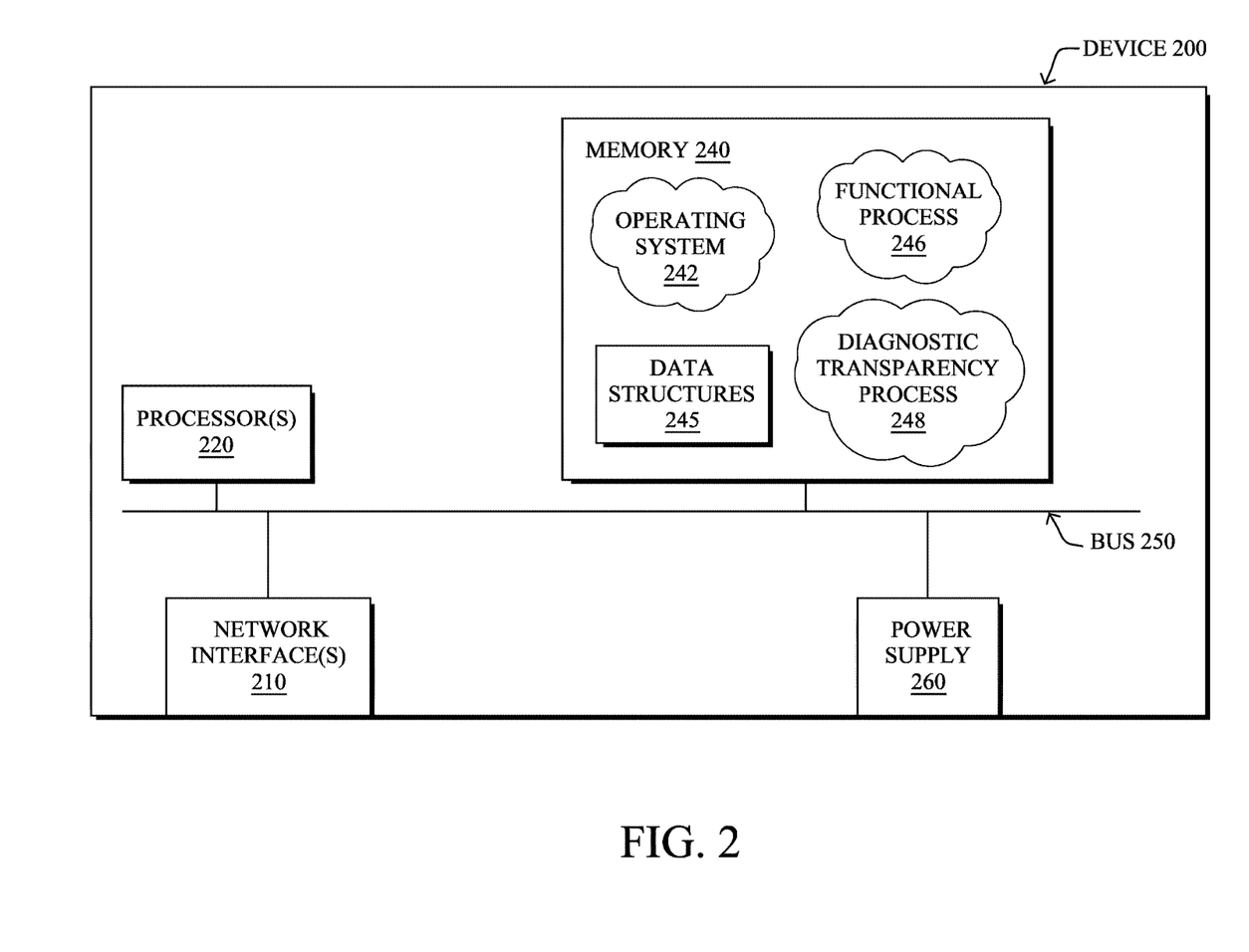
FIG. 2 illustrates an example network device/node.

FIG. 2 is a schematic block diagram of an example computing device 200 that may be used with one or more embodiments described herein e.g., as any of the devices shown in FIG. 1 above, and particularly as specific devices as described further below (e.g., servers, centralized devices, distributed processes, cloud resources, and so on) or any other computing device with access to the operations of network. The device 200 may also be any other suitable type of device depending upon the type of network architecture in place, such as IoT nodes, etc. The device may comprise one or more network interfaces 210 (e.g., wired, wireless, cellular, etc.), at least one processor 220, and a memory 240 interconnected by a system bus 250, as well as a power supply 260 (e.g., battery, plug-in, etc.).

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "diagnostic transparency" process 248, as described herein. Notably, functional processes 246, when executed by processor(s) 220, cause each particular device 200 to perform the various functions corresponding to the particular device's purpose and general configuration.

For example, a server would be configured to operate as a server, a router would be configured to operate as a router, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

——Diagnostic Transparency for On-Premise SaaS Platforms——

As noted above, enterprise software often uses software as a service (SaaS) products that handle and store significant amounts of data, where privacy and compliance reasons often require that these SaaS platforms need to be on the customer's premises. As also noted above, this configuration leads to having to provide the users (e.g., administrators) certain diagnostic capabilities and visibility of the underlying platform, particularly using coarse grained modules so that it is easy to troubleshoot.

For example, often a single user (or a subset of users) experiences issues that the rest of the users do not. Though debugging is generally automated, valuable time is lost when a customer raises an issue and a support team subsequently studies the issue, debugs the issue, and resolves the issue. Though a lot of the debugging is automated, there is valuable time lost in raising an issue by the customer, the support team looking at it, debugging it, and then hopefully resolving the issue.

Figure 3:
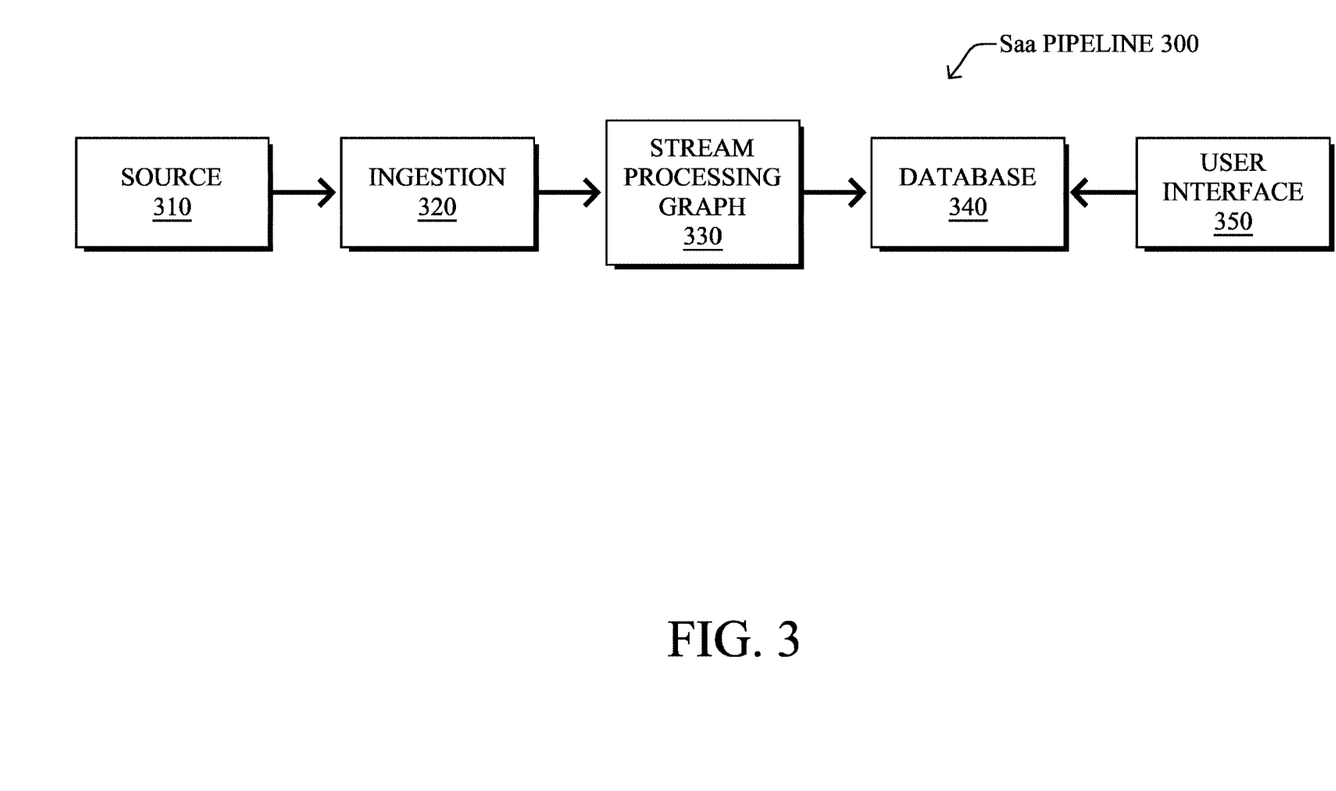
FIG. 3 illustrates an example software as a service (SaaS) pipeline.

FIG. 3 is an example schematic block diagram of a typical SaaS pipeline 300. Notably, FIG. 3 does not show the fact that each module may actually be implemented using multiple components for either horizontal scaling or simply for better functional modularization. Illustratively, a source 310 of data may be ingested by various components 320, and sent through a stream processing graph stage 330, as may be understood by those skilled in the art, and ultimately stored in a database 340. A user interface (UI) 350 may then access the database 340, accordingly.

Assuming a simple example, suppose a particular SaaS tenant, as in FIG. 3, is seeing that data being sent to the SaaS is not visible at the other end (UI 350). However, no other tenant is experiencing this issue. Typically such an issue is due to some authentication problem (e.g., the user might be using an incorrect or expired tag to send the data). This cannot be diagnosed by looking just at the client since SaaS services typically won't send acknowledgements for each and every data item being sent (usually due to concerns of scalability). In order to diagnose this issue, one would have to look at the transactions between the ingestion stage 320 and an authentication module (shown below), and identify that authentication is failing. In a well-designed system, such authentication failures can be easily identified by looking at the statistics maintained in the authentication module. The diagnosis, in this reasonably simple case, is quite straightforward and can be made automatically.

Of course per tenant issues can crop up at all constituent stages of the SaaS pipeline. For example, a database 340 might be running out of space specifically assigned to a particular customer, again exhibiting the same symptom to the user—that of the UI 350 not displaying new data. There can also be the classic case of "the SaaS appears slow to me" and such cases might need more involved debugging.

The techniques herein, therefore, allow users to run diagnostics on demand via enabling special instrumentation in the code (e.g., an on-demand onboard diagnostic tool for the product). That is, the techniques herein propose a solution that, on demand, instruments a SaaS and collects diagnostics metadata from all the SaaS components, for a specific tenant or user. This solution is in-built into the SaaS itself, since a user will otherwise not be able to collect information that is generally privileged and often times not even generated unless there is specific debugging being carried out.

Specifically, according to one or more embodiments of the disclosure as described in detail below, a server determines a trigger to diagnose a software as a service (SaaS) pipeline for a SaaS client, and sends a notification to a plurality of SaaS nodes in the pipeline that the client is in a diagnostic mode, the notification causing the plurality of SaaS nodes to establish taps to collect diagnostic information for the client. The server may then send client-specific diagnostic messages into the SaaS pipeline for the client, the client-specific diagnostic messages causing the taps on the plurality of SaaS nodes to collect client-specific diagnostic information and send the client-specific diagnostic information to the server. The server then receives the client-specific diagnostic information from the plurality of SaaS nodes, and creates a client-specific diagnostic report based on the client-specific diagnostic information.

Illustratively, the techniques described herein may be performed by hardware, software, and/or firmware, such as in accordance with the "diagnostic transparency" process 248, which may include computer executable instructions executed by the processor 220 to perform functions relating to the techniques described herein. Generally, the process 248 may be executed on any suitable network device, such as a server (e.g., local, distributed, cloud-based, etc.), the diagnosed devices, or other device with appropriate visibility, connectivity, and authority.

Operationally, an example generic workflow may begin when a customer (client) experiences an issue, and reports the issue (e.g., presses a "Report Issue" button in an application that the SaaS is providing). A notification may be returned to the user that "self-diagnosis" is being started. At this time, according to the techniques herein, a notification may be sent to the underlying SaaS implementation that self-diagnosis for a user needs to be performed, and the SaaS marks the user account as "under diagnosis", beginning the diagnosis mode herein.

Figure 4:
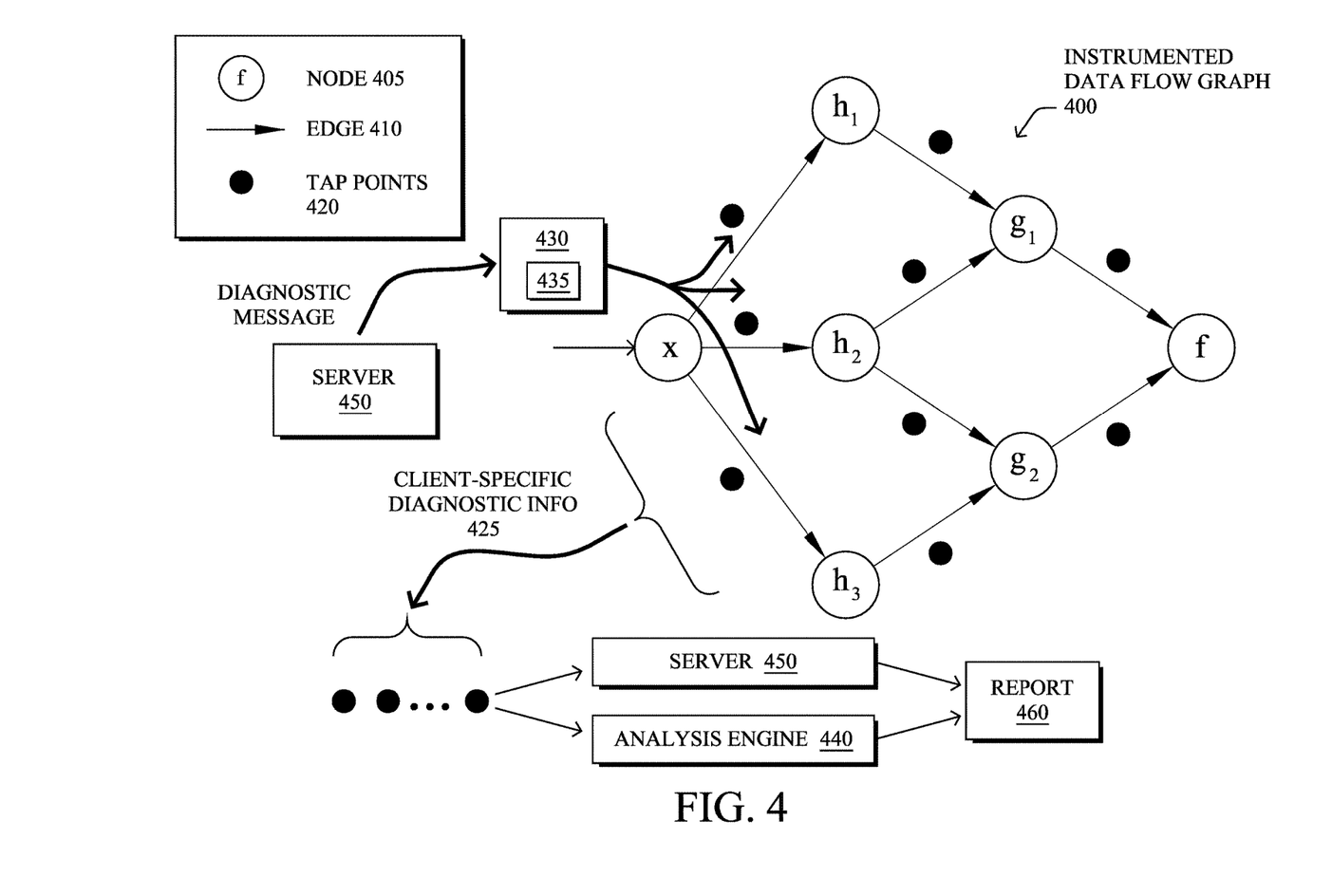
FIG. 4 illustrates an example of diagnostic taps placed on a data flow graph of a SaaS pipeline.

With reference to FIG. 4, a data flow graph 400 for an example SaaS pipeline is shown where various nodes 405 may be connected by edges 410. For instance, a processing node "x" may be the only such node, but then the flow may branch between three "h" nodes (h1, h2, and h3) (e.g., for redundant processing, load balancing, etc.), then merge down to two "g" nodes (g1 and g2), then finally down to "f" node to complete the SaaS pipeline. In response to the diagnostic mode, a number of taps 420 may be established at the SaaS nodes 405 (notably, on the edges 410, as described below). During diagnostic mode, the SaaS (e.g., an associated server 450) may send diagnostic messages 430 (e.g., dummy/diagnosis data) into the pipeline, where in one embodiment, a special client-specific token 435 may be used (unique for the user). For instance, a special token may be used so that data that the user is normally sending does not confuse the collection process.

Specifically, as shown in FIG. 4, the data flow graph 400 of the underlying SaaS may be instrumented with different tap points 420. For each edge 410 ("E(G)") in the data flow graph G, a tap point 420 may be inserted. Note that the exact method of tapping a packet will depend on the specific edge. For instance, each tap can either be implemented at the source of the edge or the destination of the edge (i.e., a node/vertex 405), under the realistic assumption that data does not get modified by the edge itself. The tapped data also includes component specific data that is useful for diagnosing tenant issues. For example, a real time processing component in the pipeline may be interested in collecting drop numbers. The exact nature of the data depends on the component and any suitable (e.g., useful) client-specific diagnostic information 425 may be collected.

The tapped data (information 425) can optionally be sent to the server 450, or else to another service (analysis engine/device 440) that processes the numbers to search for anomalies or other useful results, if any. Any such results found may thus become part of the diagnosis metadata (information 425) sent to the server, or else may be included in a created report 460.

Using these tapped data, information such as loss rate, delay, and other relevant information may be generated, and a diagnosis report 460 can be created, and optionally shown to the user (if there is no proprietary information) or is packaged as metadata for further analysis by servers, engineers, machine learning systems, and so on. Note that in one embodiment, the user may officially submit the issue along with the self-diagnosis metadata (report), or else in another embodiment, this information may be automatically sent to the servers, engineers, etc. At this time, taps 420 may be removed, and the SaaS returns to its original (non-diagnostic) state.

Regarding placement of the taps 420, in general, if there is client-specific information at any component of the SaaS, a tap should be placed at that component. With reference again to data flow diagram 400 of FIG. 4, the tap points 420 are shown in the edge 410, and the description above explains that under the assumption that an edge does not modify data moving through it, the taps 420 can be placed at nodes/vertices 405 only.

Typically, the tap collects per-client (e.g., per-user/per-tenant) statistical information from the vertices. For example, any reasonable implementation maintains detailed statistics of usage, failures, successes, acknowledgements, etc. However, if the statistics needed to debug such issues that are costly to compute, the collection process might instead be configured to start (and correspondingly end) based on some other trigger, such as the intention to diagnose a tenant specific issue (i.e., being placed in diagnostic mode).

Notably, the taps may collect different types of metrics, depending on the SaaS node's task or configuration, the client-specific nature of the collection, and so on. Generally, taps 420 according to one or more embodiments herein gather both per-user/per-tenant ingestion metrics and query metrics. For instance, the ingestion metrics collected may consist of ingestion throughput, ingestion error throughput at each of the vertices, response of times of transactions between the vertices, and so on. The query metrics, on the other hand, may comprise query response times, number of invalid queries, etc.

Figure 5:
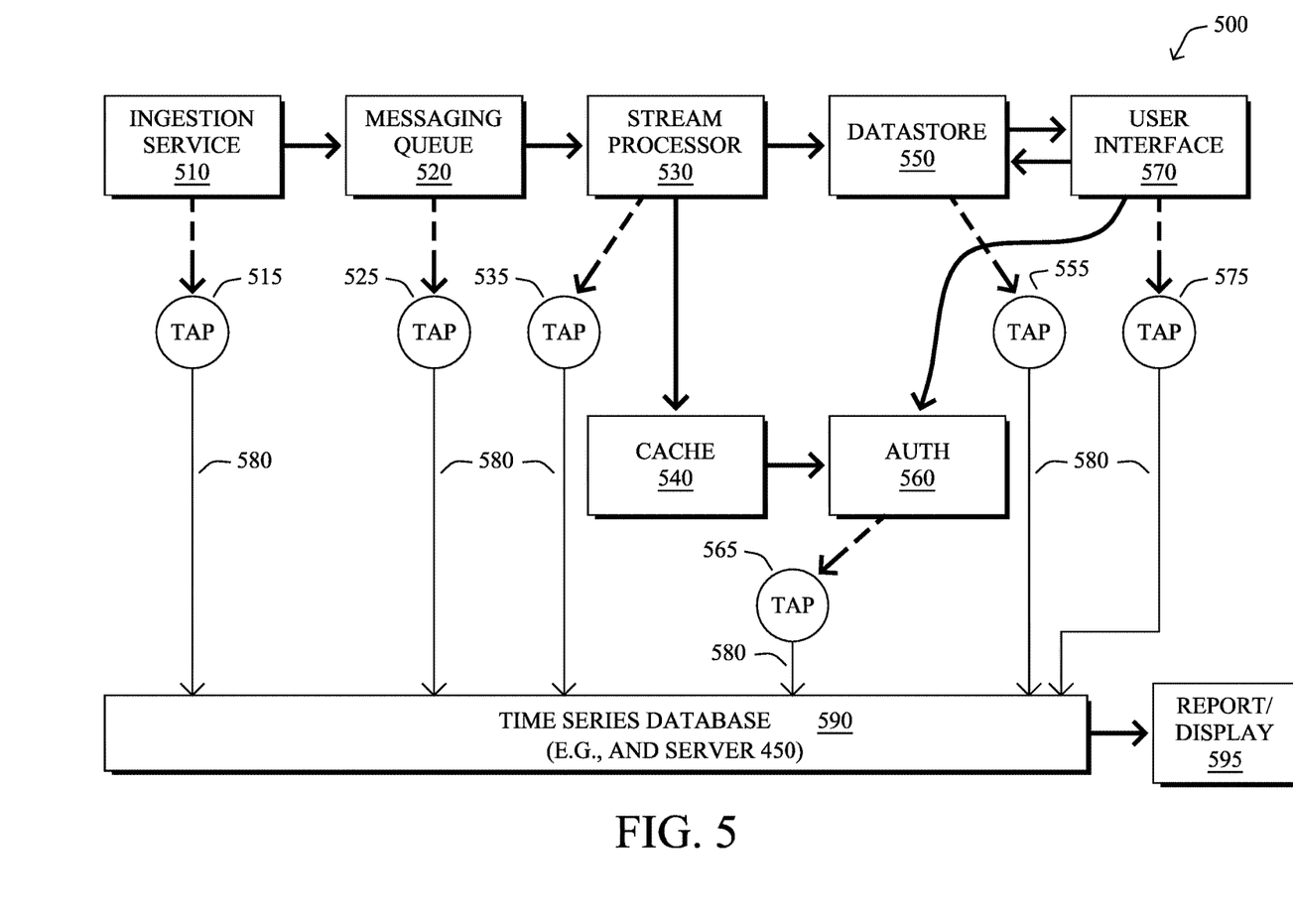
FIG. 5 illustrates an example of diagnostic taps placed on an example SaaS pipeline.

FIG. 5 illustrates another example SaaS pipeline 500 representing a centralized logging and metric collection SaaS system. As shown, the SaaS pipeline is composed of tiered distributed micro services, such as, e.g., ingestion service 510, messaging queue 520, stream processor 530, a cache 540, a data store 550, an authentication (AUTH) service (or module) 560, and a user interface 570. As described above, the techniques herein may gather per-user/per-tenant diagnostic metadata at a service level (vertices) using taps. There is illustratively a tap at each of instance of a given service (e.g., as shown, tap 515, 525, 535, 555, 565, and 575). The collected metadata (diagnostic information) 580 may be persisted to a time series database 590, which allows queries to be run, thus allowing engineers (or intelligent processes, such as machine learning systems) to diagnose issues. Note that database 590 can also be used to generate a per-user/per-tenant dashboard, such as a graphical user interface (GUI) display 595.

Illustratively, the following example schema may be used at the taps 515 and 575 for the example SaaS pipeline above (among other schema at other taps). (Note that the inclusion of the tenant token/key makes the collected (and stored) data per-tenant.)

- A tap database schema at the ingestion path (tap 515):
{ time: String, service: String, error_rate: Float, ingestion_rate: Float, transaction_time: String, user: String, tenant: String}.
- A tap database schema at the user interface (tap 575):
{ time: String, service: Float, invalid_query_count: Integer , query_response_time: Integer, user: String, tenant: String}.

Other database schema may be used in accordance with the techniques herein, and those shown above are merely two examples (of the several taps of FIG. 5) that are not meant to be limiting to the present disclosure.

Figure 6:
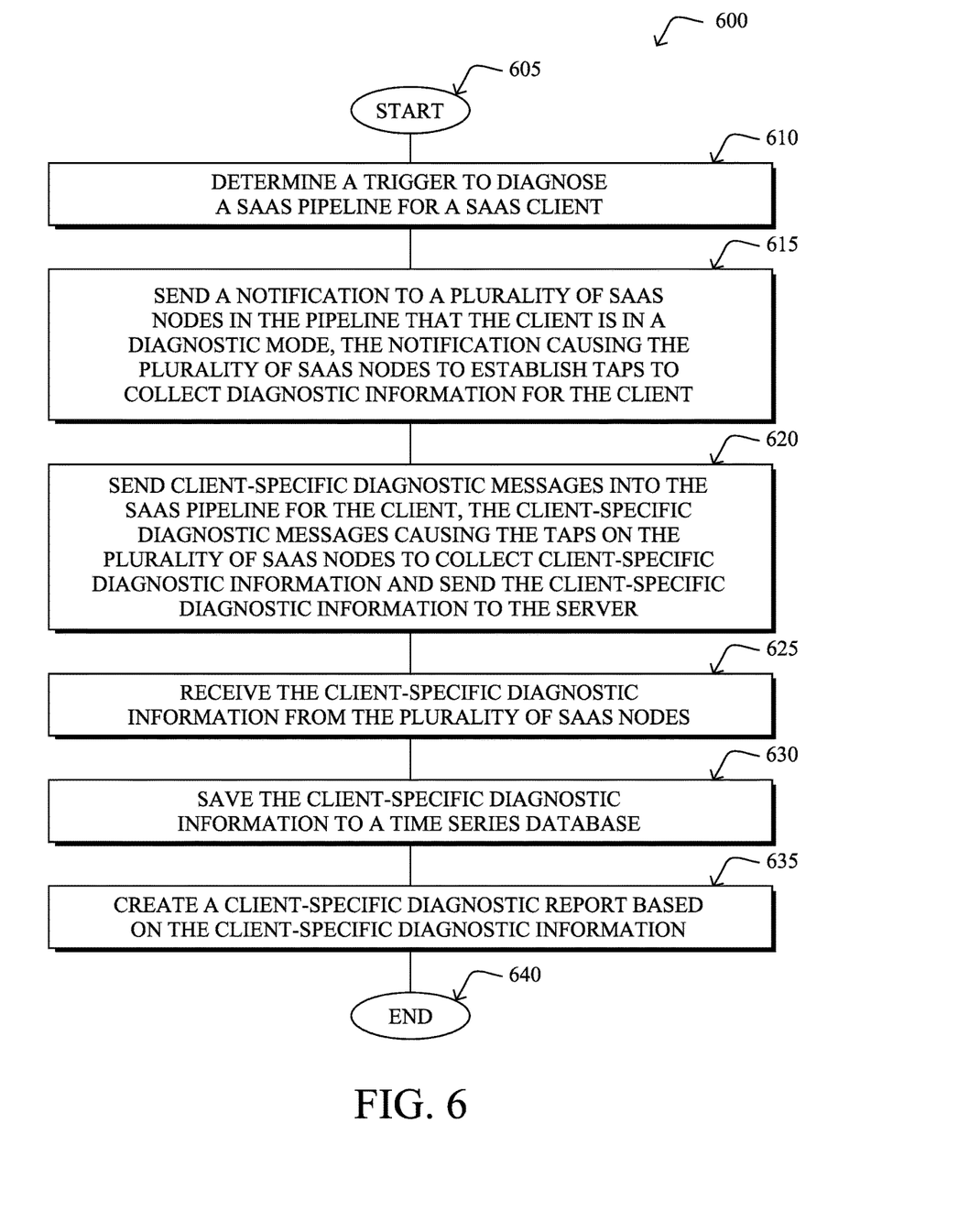
FIG. 6 illustrates an example simplified procedure for providing diagnostic transparency for on-premise SaaS platforms, particularly from the perspective of a server.

FIG. 6 illustrates an example simplified procedure for providing diagnostic transparency for on-premise SaaS platforms in accordance with one or more embodiments described herein, particularly from the perspective of a server (e.g., diagnostic device) 450. For example, a non-generic, specifically configured device (e.g., device 200) may perform procedure 600 by executing stored instructions (e.g., process 248). The procedure 600 may start at step 605, and continues to step 610, where, as described in greater detail above, the server determines a trigger to diagnose a SaaS pipeline 300/500 for a SaaS client (e.g., receiving a request from the SaaS client to perform a diagnosis of the SaaS pipeline). Note that as mentioned above, the SaaS client may be a user or a tenant (e.g., having a plurality of users), or a specific user and tenant. Also, SaaS nodes may be a shared node in a computer network or a client-owned node in a client-owned computer network (on-premise SaaS nodes).

In step 615, in response to the trigger, the service may then send a notification to a plurality of SaaS nodes 405 in the pipeline that the client is in a diagnostic mode. As described above, the notification causes the plurality of SaaS nodes to establish taps to collect diagnostic information for the client (notably, in one embodiment, only SaaS nodes that have client-specific diagnostic information).

In step 620, the server may send client-specific diagnostic messages 430 into the SaaS pipeline for the client, where the client-specific diagnostic messages cause the taps 420 on the plurality of SaaS nodes to collect client-specific diagnostic information 425 and send the client-specific diagnostic information to the server. As noted, the server may include a client-specific token 435 within the client-specific diagnostic messages in order to differentiate the client-specific diagnostic messages from non-diagnostic data messages.

The server may then receive, in step 625, client-specific diagnostic information 425 from the plurality of SaaS nodes (e.g., ingestion metrics and/or query metrics, as mentioned above). In one embodiment, the client-specific diagnostic information comprises only information collected during the diagnostic mode, but in another embodiment, as mentioned above, the client-specific diagnostic information may actually comprise information collected outside of the diagnostic mode, but sent to the server only during the diagnostic mode.

As described above, the diagnostic information received at the server 450 may actually have first been sent through an analysis engine/device 440. That is, one or more of the SaaS nodes may first send the client-specific diagnostic information to an analysis device, such that the received information is actually the results of analyzed client-specific diagnostic information.

In step 630 the client-specific diagnostic information 430 may be saved to a time series database 590. The server may then create a client-specific diagnostic report 595 in step 635 based on the client-specific diagnostic information, such as by generating a GUI display of the client-specific diagnostic report for the SaaS client.

The illustrative procedure 600 may then end in step 640, notably with the option to continue within diagnostic mode to gather more results, or else to exit the diagnostic mode, accordingly.

Figure 7:
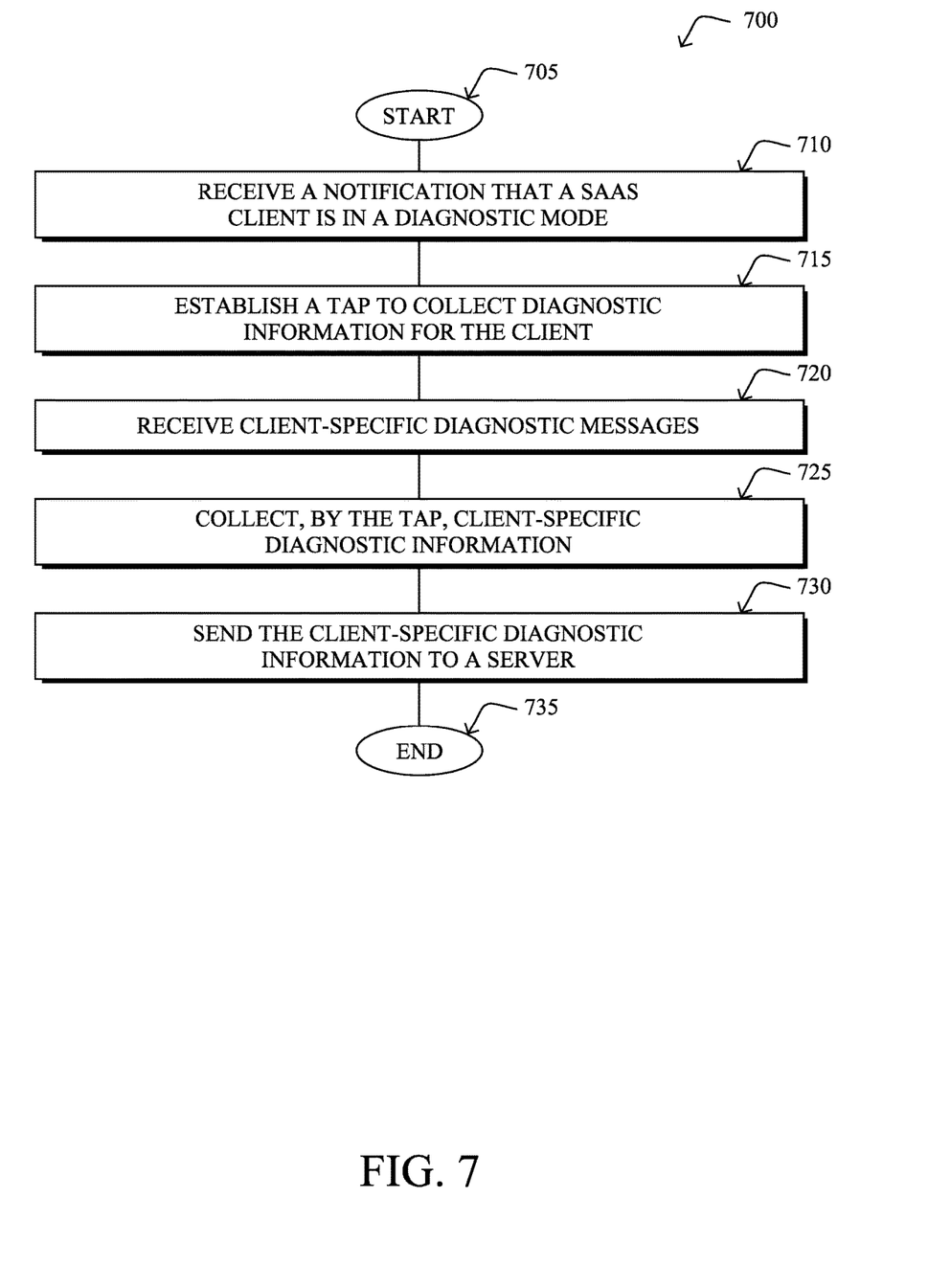
FIG. 7 illustrates an example simplified procedure for providing diagnostic transparency for on-premise SaaS platforms, particularly from the perspective of a SaaS node.

Further, FIG. 7 illustrates an example simplified procedure for providing diagnostic transparency for on-premise SaaS platforms in accordance with one or more embodiments described herein, particularly from the perspective of a SaaS node 405. For example, a non-generic, specifically configured device (e.g., device 200) may perform procedure 700 by executing stored instructions (e.g., process 248). The procedure 700 may start at step 705, and continues to step 710, where, as described in greater detail above, a SaaS node 405 (e.g., shared node in a computer network or a client-owned node in a client-owned computer network) may receive a notification that a client is in a diagnostic mode, and in response, establishes a tap 420 to collect diagnostic information for the client in step 715.

While in diagnostic mode, upon receiving client-specific diagnostic messages 430 in step 720, the SaaS node collects, by the tap 420 at the SaaS node, client-specific diagnostic information 425 in step 725. Note that as described above, included within the client-specific diagnostic messages may be a client-specific token 435, such that the SaaS node may differentiate the client-specific diagnostic messages from non-diagnostic data messages based on the client-specific token, accordingly.

The collected client-specific diagnostic information may then be sent to a server in step 730, where the server may be the diagnostic device 450, the database 590 for access by the server 450, or else, in one embodiment, an analysis device 440 (to produce results of analyzed client-specific diagnostic information as the client-specific diagnostic information to the server 450). Note that as mentioned above, the information may be collected outside of the diagnostic mode (e.g., general statistics), or else may strictly be from information obtained during the diagnostic mode.

The illustrative procedure 700 may then end in step 735, notably with the option to continue receiving diagnostic messages 430 and sending information from the taps, accordingly, until the end of the diagnostic mode.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for diagnostic transparency for on-premise SaaS platforms. In particular, the techniques herein provide a per-tenant/per-user functionality that is currently unavailable to network engineers, where it can be determined which components are to be tapped, how it is known what to tap, and how metadata is associated with context. That is, the techniques herein determine the location, type, and capabilities of the individual TAPs, and focus the diagnostics on a user or tenant identifier. The techniques herein thus adequately address the complexity of today's applications, (e.g., multiple services interconnected with networking, and that are potentially sensitive to many new changes in the deployment environment), which is a complexity that is far greater that what has been dealt with in the past.

Moreover, the techniques described herein allow operations engineers for a SaaS product, especially on-premise SaaS products, to quickly identify problems that are not systemic but instead only affect a subset of customers, thus improving the efficiency of the support team. Additionally, diagnostic metadata collected at the granularity of users/tenants can be used by SaaS providers to ensure that tenant service level agreements (SLAs) are met, while tenants can also use the same data to verify the SLAs. Furthermore, Per-user/tenant diagnostic metadata also helps in identifying the user/tenant usage patterns (e.g., the jobs the users are running), which is vital information for forecasting application demand and capacity planning.

Notably, diagnostics exist on many levels, such as allowing a user to assist in the diagnostic of issues on his/her laptop. For example, when a wireless connection does not work, users are generally allowed to diagnose the issue and a report is generated. Typically such collection is limited to the individual laptop (the client) whereas the problem might lie somewhere in the network (the server). Extending this collection (and possible diagnosis) in a SaaS deployment, which typically has a myriad of stages, is not trivial. The techniques described above, however, help bring user/tenant-based diagnostics into the SaaS domain. Other systemic diagnostics in SaaS, i.e., covering all SaaS components, mainly concentrate on the application (e.g., request latencies, errors, etc.) and the underlying infrastructure (e.g., servers, ports, modules, etc.). For example, an application monitoring solution may collect diagnostic metadata for an application as a whole, but does not do so at the granularity of the application's user. The techniques herein, however, do collect diagnostics at the granularity of users/tenants, and does so at the network side (e.g., of a VPN), and not merely at the customer's side. Each of these mentioned solutions, though providing valuable insight into the availability, health, and performance of an application, provide no further information on performance of the application as perceived by a specific user or tenant (unless of course the issue is systemic and affects all users). The techniques herein, therefore, are a valuable tool for diagnosing SaaS platforms, as described above.

While there have been shown and described illustrative embodiments that provide for diagnostic transparency for on-premise SaaS platforms, it is to be understood that various other adaptations and modifications may be made within the spirit and scope of the embodiments herein. For example, while certain embodiments are described herein with respect to SaaS platforms in particular, the techniques herein may be applicable to any distributed computing/processing system. In addition, while certain network types are shown, such as, LANs and WANs, the techniques herein are applicable to any type of computer network, such as Internet of Things (IoT) networks, ad-hoc networks, mobile networks, peer-to-peer networks, and so on, as well as any combination thereof, and any combination of shared resources and client-owned resources. That is, the embodiments have been shown and described herein with relation to specific network configurations (orientations, topologies, protocols, terminology, devices, etc.). However, the embodiments in their broader sense are not as limited, and may, in fact, be used with other types of networks and protocols, regardless of their nomenclature or underlying communication protocol.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a server, a trigger to diagnose a software as a service (SaaS) pipeline for a SaaS client;
   initiating, by the server, a self-diagnosis process on the client based on the trigger;
   sending, from the server, a notification to a plurality of SaaS nodes in the pipeline that the client is in a diagnostic mode, the notification causing the plurality of SaaS nodes to establish taps on each of the respective SaaS nodes in the pipeline, wherein the taps collect diagnostic information for the client;
   sending, from the server, client-specific diagnostic messages into the SaaS pipeline for the client, the client-specific diagnostic messages causing the taps on the plurality of SaaS nodes to collect client-specific diagnostic information and send the client-specific diagnostic information to the server;
   receiving, at the server, the client-specific diagnostic information from the plurality of SaaS nodes; and
   creating, by the server, a client-specific diagnostic report based on the client-specific diagnostic information.

2. The method as in claim 1, further comprising:
   including, within the client-specific diagnostic messages, a client-specific token to differentiate the client-specific diagnostic messages from non-diagnostic data messages.

3. The method as in claim 1, further comprising:
   generating a graphical user interface (GUI) display of the client-specific diagnostic report for the SaaS client.

4. The method as in claim 1, wherein the plurality of SaaS nodes that establish taps are only SaaS nodes that have client-specific diagnostic information.

5. The method as in claim 1, wherein one or more of the plurality of SaaS nodes send the client-specific diagnostic information to an analysis device, and wherein receiving the client-specific diagnostic information from those one or more of the plurality of SaaS nodes comprises:
   receiving results of analyzed client-specific diagnostic information as the client-specific diagnostic information for those one or more of the plurality of SaaS nodes.

6. The method as in claim 1, wherein determining the trigger comprises:
   receiving a request from the SaaS client to perform a diagnosis of the SaaS pipeline.

7. The method as in claim 1, wherein the SaaS client is one or both of a user and a tenant having a plurality of users.

8. The method as in claim 1, wherein the client-specific diagnostic information from the plurality of SaaS nodes comprises information collected outside of the diagnostic mode, but sent to the server only during the diagnostic mode.

9. The method as in claim 1, wherein the client-specific diagnostic information from the plurality of SaaS nodes comprises only information collected during the diagnostic mode.

10. The method as in claim 1, wherein the client-specific diagnostic information comprises one or both of ingestion metrics and query metrics.

11. The method as in claim 1, further comprising:
    saving the client-specific diagnostic information to a time series database.

12. The method as in claim 1, wherein SaaS nodes comprise both shared nodes in a computer network and client-owned nodes in a client-owned computer network.

13. A tangible, non-transitory, computer-readable medium storing program instructions that cause a computer to execute a process comprising:
    determining a trigger to diagnose a software as a service (SaaS) pipeline for a SaaS client;
    initiating, by the server, a self-diagnosis process on the client based on the trigger;
    sending a notification to a plurality of SaaS nodes in the pipeline that the client is in a diagnostic mode, the notification causing the plurality of SaaS nodes to establish taps on each of the respective SaaS nodes in the pipeline, wherein the taps collect diagnostic information for the client;
    sending client-specific diagnostic messages into the SaaS pipeline for the client, the client-specific diagnostic messages causing the taps on the plurality of SaaS nodes to collect client-specific diagnostic information and send the client-specific diagnostic information to the server;
    receiving the client-specific diagnostic information from the plurality of SaaS nodes; and
    creating a client-specific diagnostic report based on the client-specific diagnostic information.

14. The computer-readable medium as in claim 13, wherein the process further comprises:
    including, within the client-specific diagnostic messages, a client-specific token to differentiate the client-specific diagnostic messages from non-diagnostic data messages.

15. The computer-readable medium as in claim 13, wherein the process further comprises:
    generating a graphical user interface (GUI) display of the client-specific diagnostic report for the SaaS client.

16. The computer-readable medium as in claim 13, wherein the plurality of SaaS nodes that establish taps are only SaaS nodes that have client-specific diagnostic information.

17. The computer-readable medium as in claim 13, wherein one or more of the plurality of SaaS nodes send the client-specific diagnostic information to an analysis device, and wherein the process, when executed to receive the client-specific diagnostic information from those one or more of the plurality of SaaS nodes, further comprises:
  receiving results of analyzed client-specific diagnostic information as the client-specific diagnostic information for those one or more of the plurality of SaaS nodes.

18. A method, comprising:
  receiving, at a software as a service (SaaS) node along a SaaS pipeline for a SaaS client, a notification that the client is in a diagnostic mode;
  establishing, by the SaaS node in response to the notification, a tap on the SaaS node to collect diagnostic information for the client;
  receiving, at the SaaS node, client-specific diagnostic messages;
  collecting, by the tap at the SaaS node in response to the client-specific diagnostic messages, client-specific diagnostic information, wherein the tap enables the client to run an on-demand self-diagnosis; and
  sending, from the SaaS node, the client-specific diagnostic information to a server.

19. The method as in claim 18, wherein included within the client-specific diagnostic messages is a client-specific token, the method comprising:
  differentiating the client-specific diagnostic messages from non-diagnostic data messages based on the client-specific token.

20. The method as in claim 18, further comprising:
  collecting information outside of the diagnostic mode, wherein the client-specific diagnostic information comprises the information collected outside of the diagnostic mode.

* * * * *